May 28, 1940.  R. L. WAGNER  2,202,130
METAL SHAPING PROCESS AND APPARATUS
Original Filed Feb. 23, 1934  2 Sheets-Sheet 1
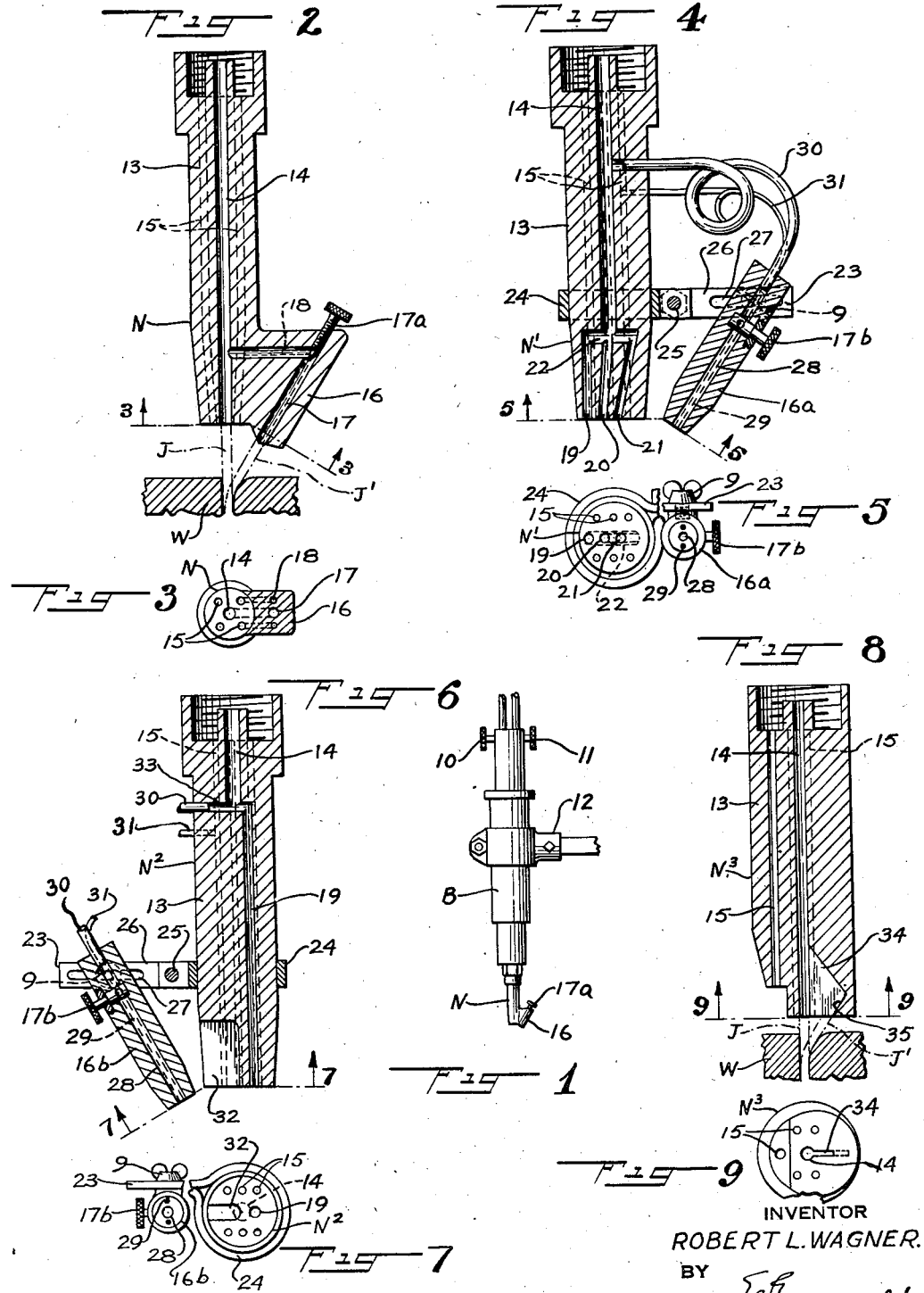
INVENTOR
ROBERT L. WAGNER.
BY
ATTORNEY

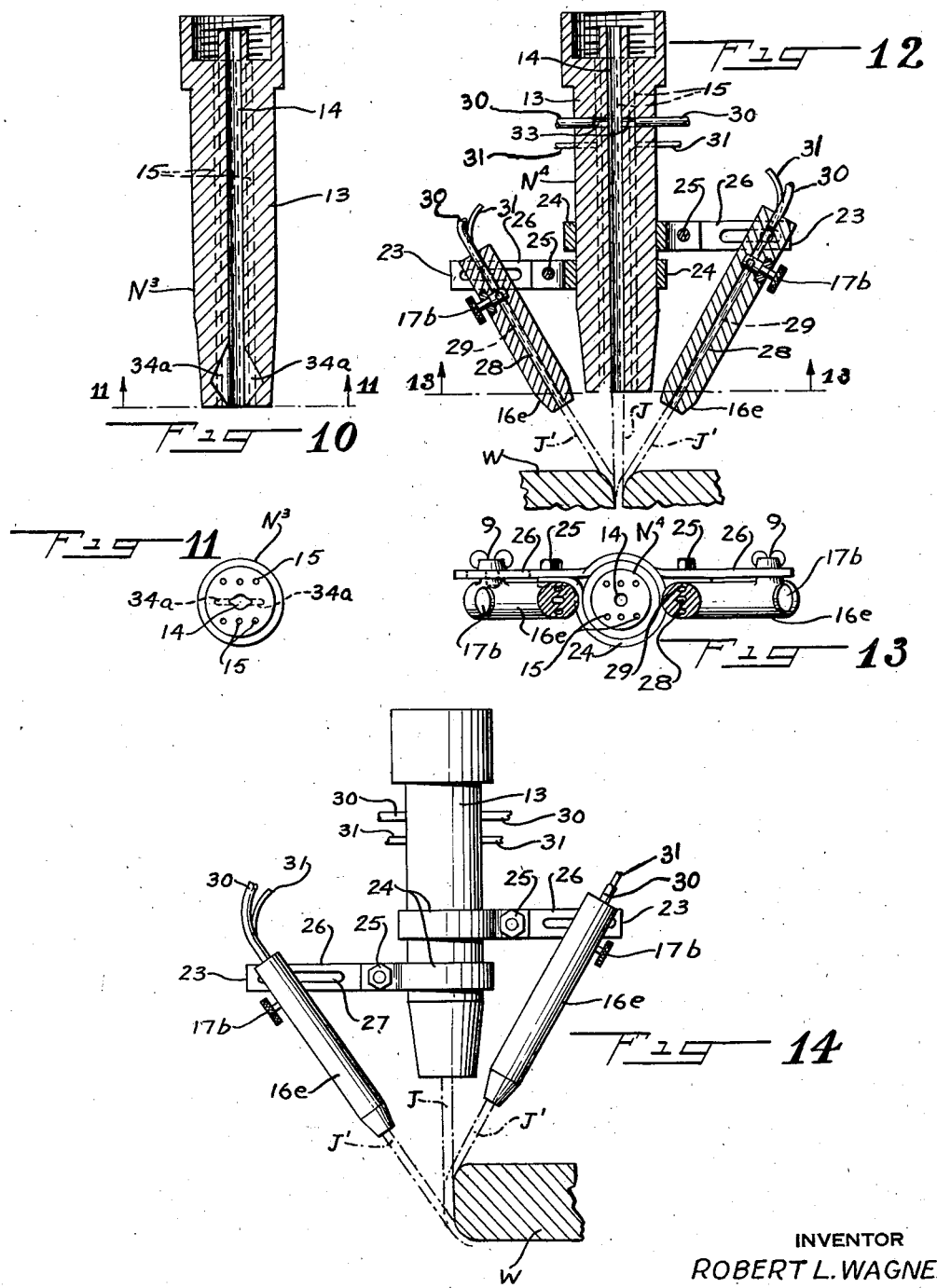

Patented May 28, 1940

2,202,130

UNITED STATES PATENT OFFICE 2,202,130

METAL SHAPING PROCESS AND APPARATUS

Robert L. Wagner, Niagara Falls, N. Y., assignor, by mesne assignments, to Union Carbide and Carbon Corporation, a corporation of New York Application February 23, 1934, Serial No. 712,524
Renewed January 7, 1938

23 Claims. (Cl. 148—9)

This invention relates to a process whereby a plurality of cuts may be simultaneously made on a metallic base, no two of which cuts are in the same plane, and particularly to the making of a main severing cut through a metallic base and simultaneously shaping an edge or certain edges produced by making the main cut. The invention also relates to apparatus whereby the process may be carried out with facility and precision.

An important application of the invention under contemplation is in the cutting of plates, bars, billets, or the like of steel or steel alloys from stock and simultaneously therewith rounding or otherwise shaping an edge or edges of the cut being made, so that such a steel plate or other metallic object may be cut and shaped in a single operation suitable for delivery in finished condition for immediate use in construction work without the necessity of further machining or other finishing operations thereupon.

Heretofore, shaping of edges of a surface on a metallic body of this character resulting from a cut made therethrough, as by rounding or beveling, has been accomplished by hand or machine in a separate operation from the severing cut, after the severing cut has been completed and has customarily consisted in filing down or machining the edge or edges to the desired shape manually or semi-automatically, generally in a manner destructive to a material part of the base metal being operated upon. This additional operation, as heretofore carried out, is also laborious and time consuming and requires a high degree of skill and care in order to attain the desired refinement and precision of workmanship.

It is, therefore, an object of this invention to provide an improved process and apparatus for making cuts through metallic bodies whereby a plurality of such cuts may be simultaneously made, no two of which are in the same plane, with precision and refinement of workmanship and without destruction or mutilation of any material part of the metallic body being operated upon.

A further object of the invention is the provision of an improved process and apparatus for severing metallic bodies whereby one or more edges resulting from making a cut through the body may be suitably shaped simultaneously with making the cut, without damage to either of the severed parts of the metallic body and so as to provide metallic objects cut from stock in a suitable finished shape for immediate use.

A further object of the invention is to provide an improved process and apparatus for simultaneously shaping a plurality of the edges defining a surface on a metallic body.

The invention herein described is broadly applicable to the shaping of any portion of a metallic body but will be herein set forth in connection with the shaping of the edges of a surface or surfaces resulting from a cut made through the metallic body being operated upon.

Accordingly the process may consist in simultaneously applying two or more gaseous cutting jets, preferably a main cutting jet and one or more edge shaping jets, progressively along a line of severance of a metallic body together with suitable preheating means, as jets of fuel gas, for raising the metallic body in the regions of cutting jet application to cutting temperature.

In making a main cut with a beveled or rounded edge, the main and shaping jets should be maintained throughout their progress in fixed angular relation to each other and the shaping jet should be so controlled as to avoid action thereof upon any portion of the base metal except the edge to which it is being applied. This may be conveniently accomplished by interposing suitable means for interrupting the normal course of the shaping jet stream between the edge being shaped thereby and the opposite side of the main cut. The means interposed in the application of the process herein detailed should be such as to prevent any deleterious or destructive action or influence of the shaping jet upon the metal on the opposite side of the main cut.

In making a rounded or radius cut, upon the edge by means of a shaping jet, the jet may be gradually diverted from its normal course and turned around the edge in a curved path tangent thereto by subjecting it to a suitable turning influence, for example, a stream of gas intersecting the shaping jet. In addition to exerting a turning influence, this turning jet may be of such character as to interrupt the course of the shaping jet to prevent its crossing the line of a main cut being made simultaneously with the shaping cut, thereby avoiding undesirable action by the shaping jet on the base metal on the opposite side of the main cut.

Preferably, the main cutting jet is employed as both the turning and interrupting means, into which the edge shaping jet is projected to such an angle and at such velocity that the shaping jet is turned thereby along the desired path. Conveniently the shaping jet is projected into the stream of the main cutting jet at a lower velocity than that of the main jet, the velocities of the two jets being selected so that the main cutting jet impresses the desired curvature upon the stream of the shaping jet.

The curvature of this stream may be varied by proper manipulation of the relative velocities and/or by proper variation of the angular adjustment of the jets to each other and/or by varying the distance of the shaping jet discharge from the point of its confluence with the main cutting jet.

In applying the jets or other severing and shaping means to the body along a line of severance, they should be maintained in the same relation to each other with respect to the line of severance throughout the progress of the operation regardless of any change in direction the line may take.

When it is desired to shape only one edge of a surface resulting from a main cut simultaneously with making the main cut, a single shaping jet may be employed in cooperation with a main cutting jet, the shaping jet being projected at an angle to the main jet in the manner described above. However, several jets may be employed in making a main cut with a beveled or rounded edge or edges and, where a rounded edge is desired, one of the jets may be caused to travel in the plane of the main cut while the other jets are projected into the stream thereof at progressively widening angles.

Where two edges on opposite sides of a main cut are to be simultaneously shaped, two shaping jets may be provided one on each side of the main jet considered with respect to the line of travel and projected at the desired angle thereto. Where the edges are to be rounded, both shaping jets may be projected into the stream of the main jet in the manner described above.

Similarly, when two opposite edges of the same surface both on the same side of the main cutting jet are to be shaped, two shaping jets may be employed in cooperation with a main jet, one of which is projected in the manner described above from the same side of the main jet with the edge to be shaped thereby and the other from the opposite side. In case a rounded or radius cut on the edges is desired, the first jet may be projected into the stream of the main jet so as to be turned thereby around one of the edges to be rounded and the other so as to turn the main jet around the other edge. In this case, the shaping jets should be projected so as to converge with the main jet at points so spaced that each will affect only the edge to which it is being applied. These shaping jets are preferably projected, the first at such lower and the second at higher velocity than that of the main cutting jet as to respectively be turned by and to turn the main cutting jet in paths of the desired curvature. In applying the process to the shaping of two opposite edges of the same surface, the shaping operation will ordinarily be performed subsequently to making the main severing cut but under certain circumstances may be made simultaneously with the main cutting operation.

Apparatus whereby the process outlined above may be carried out with facility and precision will be hereinafter set forth in detail and may comprise, briefly, a blowpipe construction adapted either for employment in hand or machine operations and in which is provided a main nozzle adapted to provide a main cutting jet and one or more supplementary or shaping nozzles for providing supplementary or shaping jets. The shaping nozzles are arranged to project their respective jets at angles to the path of the main jet and, where it is desired to produce a rounded contour, the shaping nozzle or nozzles are preferably arranged to project their jets into the stream of the main cutting jet in the manner stated above.

Other objects and novel features of the invention will appear from the following specification in conjunction with the accompanying drawings, in which:

Fig. 1 is a view in elevation showing a blowpipe with one embodiment of my nozzle connected therewith.

Fig. 2 is a sectional view of the nozzle shown in Fig. 1 on a plane through the longitudinal axis thereof and on an enlarged scale.

Fig. 3 is a cross sectional view of the nozzle shown in Figs. 1 and 2, taken on line 3—3 of Fig. 2.

Figs. 4 and 5, 6 and 7, 8 and 9, 10 and 11, are views in axial section and bottom plan respectively of various modifications of blowpipe nozzles made in accordance with my invention; the bottom plan views being on lines designated respectively by numerals 5—5, 7—7, 9—9 and 11—11.

Figs. 12 and 13 are views, respectively, in axial section and cross section on line 13—13 of Fig. 12 showing a still further embodiment of the invention.

Fig. 14 shows an arrangement of the nozzle shown in Figs. 12 and 13 for simultaneously rounding two opposite edges of the same surface.

In Fig. 1 of the drawings, is shown a blowpipe of a type adapted to be mechanically or manually manipulated in making a cut with a rounded edge in the manner set forth above and comprises a body B to which a main nozzle N constructed in accordance with my invention is attached. Suitable valves 10 and 11 are provided on the body for respectively controlling the flow of cutting and fuel gas through the body and suitable supporting means 12 may be provided whereby the blowpipe may be attached to appropriate parts of a machine or manually operated. Associated with the main nozzle N is a supplemental or shaping nozzle 16 positioned with respect to the main nozzle so as to cut or otherwise shape an edge of a surface produced by the jet from the main nozzle.

The nozzle construction shown in Fig. 1 is shown in detail on an enlarged scale in Figs. 2 and 3 and comprises the usual metallic body 13 having a central passage 14 therethrough for cutting gas surrounded by a plurality of fuel gas passages 15, as shown four in number, parallel therewith. The supplemental or edge shaping nozzle 16 preferably is formed integrally with nozzle N and provided with a cutting gas passage 17 communicating with the passage 14 and fuel gas passages 18 communicating with certain of the fuel gas passages 15. Passages 15 are preferably equally spaced about passage 14 so as to permit cutting during either a forward or backward movement of the apparatus and are so located as not to intercept or interrupt the jet from passage 17. Flow of cutting gas through passage 17 may be under control of a valve 17a adapted to be set for any desired volumetric or pressure flow of gas through this passage. The approximate paths of the main and shaping jets discharged by passage 14 of nozzle N and passage 17 of nozzle 16 are indicated by dotted lines at J and J' respectively in Fig. 2 in relation to the work indicated by the reference character W.

In operation, the apparatus shown in Figs. 1, 2, and 3 is moved along the line of cut so that the nozzle N will project its cutting jet in the plane of the main cut, the nozzle 16 being maintained throughout this movement at all times on the same side of this line and within a plane with the main nozzle N transversely of the line of cut and preferably at right angles thereto so that the cutting jet from nozzle 16 will be projected into the stream of the main cutting jet confluent therewith at or near the top of the edge to be shaped thereby. The nozzles are maintained throughout this movement in the same relation to each other with respect to the line of movement regardless of any change in direction the line may take. The preheating jets associated with the cutting jets are at the same time projected upon the work in fixed relation to the cutting jets.

Figs. 4 and 5 show a construction of nozzle, N¹ which operates in the same manner as that shown in Figs. 1 and 2 and in which the cutting oxgen passage 14 is discharged through a plurality of outlet passages 19, 20, and 21, the latter two being inclined at varied angles to the first so as to effect the desired gradual rounding of the edge of the surface produced by the jet discharged by passage 19 as the several jets are progressively applied along the line of cut. The outlet passage 21 furthest from outlet 19 to this end discharges at a greater inclination thereto than outlet passage 20. The passages 19, 20, and 21 might be supplied with gas from any suitable source or sources and as shown they are all supplied from a common source and to this end are connected with passage 14 through a cross passage 22. The fuel passages 15 in this nozzle are arranged in opposition forwardly and rearwardly of passages 19, 20, 21 in equal numbers and the nozzle is therefore capable of cutting in either a forward or a backward direction with equal facility. Supplementing the nozzle N' is an edge shaping nozzle 16a which is adjustably mounted on nozzle N' by means of a bracket 23 having a loop 24, surrounding nozzle N' and adapted to be adjusted lengthwise thereof and to be suitably clamped in adjusted position thereon, as by a nut and bolt 25. The bracket has a lateral arm 26 slotted at 27 to permit adjustment of the nozzle 16a lengthwise and angularly relative to the arm; a suitable means being provided as a bolt and wing nut 9 for holding the nozzle 16a in the various positions of angular and linear adjustment on the arm. The nozzle 16a has an oxygen passage 28 and fuel gas passages 29 therethrough which may be suitably connected respectively with the oxygen passage 14 and fuel gas passages 15 of the main nozzle N' by suitable means as by flexible metal tubing 30 and 31. By the arrangement described above, nozzle 16a may be adjusted with respect to the nozzle N' for effecting variations in the shape of the surface produced by the jet of nozzle 16a.

Nozzle N² shown in Figs. 6 and 7 differs from that shown in Figs. 4 and 5 principally in that the outlets 20 and 21 are omitted and the lower end of the nozzle N' is slotted at 32 to permit greater freedom of the adjustment of the shaping nozzle 16b with respect to the main nozzle N² to the end that its cutting jet may be discharged into that of the main nozzle over a wider range of distances from the end of the main nozzle. Passage 19 and conduit 30 connect respectively with opposite ends of a cross passage 33 which, in turn, connects with cutting gas passage 14.

In Figs. 8 and 9 are shown a nozzle construction N³ whereby both the main cutting jet and the edge shaping jet are provided by suitably shaping the discharge end of the main cutting gas passage 14. This is accomplished by providing, at one side of the discharge end of this passage, a pocket or recess 34 of flattened and constricted contour having a lower wall 35 which slopes at a suitable angle toward the main cutting jet so that the stream of the jet J' discharged from the pocket will flow into the stream of the jet J discharged by the main channel of the passage at an angle thereto and at desirably decreased velocity so that the force of the main jet will exert a turning influence thereupon of the character described above. The passage 14 is surrounded by fuel gas passages 15 as in the other nozzles herein described.

The construction shown in Figs. 10 and 11 varies from that shown in Figs. 8 and 9 by provision of pockets or recesses 34a of the same character as pocket 34 in Fig. 8 on both sides of the main channel of passage 14. This nozzle is designed for shaping the edges on both sides of the main cut simultaneously with making the main cut.

Figs. 12 and 13 also illustrate a nozzle arrangement whereby the edges on both sides of a cut may be shaped simultaneously with making the main cut. In this arrangement a main nozzle N⁴ having a cutting gas passage 14 therethrough with a plurality of fuel gas passages 15 forwardly and rearwardly thereof is provided. The fuel gas passages in this form of the invention are arranged in spaced, opposing pairs as in other forms previously described. Supplemental nozzles 16e for producing edge shaping jets are provided one on each side of the main nozzle N⁴ and are mounted on brackets 26 similar to those shown in Figs. 4 and 6 each individually adjustable lengthwise of the main nozzle and upon which nozzles 16e are horizontally and angularly adjustable in the same manner as nozzles 16a and 16b described above. In operation, this form of the invention is manipulated in the same manner as that set forth in connection with Figs. 1, 2, and 3.

In Fig. 14 is illustrated an application of the nozzle arrangement shown in Figs. 12 and 13 for shaping two opposite edges of the same surface of a metallic body. In this arrangement, the supplemental nozzle 16e, shown in Fig. 14 on the left of the main nozzle, is positioned to project its jet J' so that it will converge with that projected by the main nozzle, and preferably at a sufficiently higher velocity than that of the main jet J to turn the latter in a path of the desired curvature around the bottom edge of the work. The jet from the supplemental nozzle 16e, on the right of the main nozzle, at the same time is arranged to project its cutting jet into the stream of the main cutting jet at a lower velocity than that of the main jet in the manner previously described. The double edge shaping operation shown in Fig. 14 is ordinarily performed after the main cut has been completed and one of the severed parts removed so as to prevent injury thereto. However, under certain circumstances, as where one of the severed parts is waste material, the main cut and both of the shaping cuts may be made simultaneously.

The edge shaping nozzles in the forms of the invention shown in Figs. 4, 6, 12, and 14 are all provided with suitable valves 17b for a purpose similar to that of valve 17a in Figs. 1 and 2.

I have described herein several modified forms of nozzle construction and arrangement for carrying out the principles of my invention. Other constructions and arrangements of nozzles may obviously be made within the scope of the invention and other uses may be made of the invention than those herein set forth.

It is also within the purview of the invention to provide the main and shaping jets from separate blowpipes skillfully manipulated by an operator for producing a cut with an edge of desired shape. Further, a shaping jet may be employed independently of a main cutting jet by subjecting it to a suitable turning influence, as for instance a jet of inert gas, in producing a rounded surface. Also, the shaping jet may be used in association with a main cutting jet and may be made to follow behind the main jet so as to be uninfluenced thereby, in which case it depends on other means than the main cutting jet for turning it about the edge to be shaped. A bevel cut may be made by the shaping jet without damage to metal on the opposite side of the main cut by employing other interrupting means than the main cutting jet and to this end a shield with no jet turning force and of sufficient heat insulating characteristics for the purpose at hand may be employed. Obviously, the process may be used in whole or in part with good results and variations therein may be made within the scope of the invention. I do not wish, therefore, to be limited to any precise construction or application of the invention except as I shall be limited by the appended claims broadly interpreted in view of the state of the prior art.

I claim:

1. Process of forming a curved surface on a metallic object which consists in applying a cutting jet thereto together with heating means for raising the region of jet application to cutting temperature while subjecting the jet to a bending influence of a character that will cause it to follow a path of the desired curvature and tangent to the portion of the metallic body being treated.

2. Process of making a cut through a metallic body and simultaneously shaping an edge on one side of the cut, which comprises applying a main gaseous cutting jet progressively along the line of the cut together with heat at cutting temperature, and at the same time applying a shaping gaseous cutting jet in the plane of the main jet transversely of said edge, the shaping jet thereby being interrupted by the main jet, and the metal on the opposite side of the cut thereby being protected from the action thereupon of the shaping jet.

3. Process of simultaneously forming a plurality of surfaces on a metallic body which comprises providing a gaseous cutting jet for each surface to be formed, effecting relative movement between the metallic body and the jets while applying the jets to the body so as to make their respective cuts, the stream of one of the jets being under influence of means directing it in a curved path tangent to the portion of the body to which said jet is being applied, and applying cutting preheat to the regions of jet application.

4. Process of simultaneously forming a plurality of surfaces on a metallic body which comprises providing a cutting jet for each surface to be formed, effecting relative movement between the metallic body and the jets while applying the jets to the body so as to make their respective cuts, the stream of one of the jets being under influence of means causing it to assume a curved path convergent with that of the other jet, and applying cutting preheat to the regions of jet application.

5. Process of simultaneously forming a plurality of surfaces on a metallic body which comprises providing a cutting jet for each surface to be formed, effecting relative movement between the body and said jets while applying the jets to the body along predetermined lines of cut, maintaining the jets in angular confluent relationship, one of the jets being at a sufficiently lower velocity than the other to be turned thereby in a curved path, and heating the metallic body in the regions of jet application to cutting temperature.

6. The process of simultaneously shaping separate and distinct parts of a metallic body which comprises providing a cutting jet for each part to be shaped, applying the jets to said parts, effecting relative movement between the body and the jets while subjecting the jets to influences capable of directing them upon said parts and bending them in curved paths, and preheating the said parts progressively by the application thereto of heat at cutting temperature.

7. The process of forming a rounded edge on a metallic body which consists in progressively applying a cutting jet along the edge while subjecting the jet to means for exerting a bending influence thereupon capable of directing it in a curved path around the edge, and preheating the edge to cutting temperature.

8. Process of forming on a metallic body a surface with a rounded edge which comprises progressively applying a stream of cutting gas to the body together with heat sufficient to raise the body in the region being treated to cutting temperature, and applying a second stream of cutting gas positioned so that the same will be turned by the first-named stream in a curved path around the edge to be rounded.

9. Process of making a cut through a metallic body so that the edges of the surfaces formed by the cut on both sides thereof will be provided with a rounded edge; which consists in progressively applying a main cutting jet together with heat at cutting temperature to the body along the line of the cut, progressively applying a supplemental cutting jet of lower velocity than said main cutting jet to each of the edges to be rounded and engaging each of said supplemental cutting jets with said main cutting jet below the surface of said metallic body for changing the direction of flow of said supplemental cutting jets.

10. Process of simultaneously shaping opposite edges of a surface of a metallic body which comprises applying a main gaseous cutting jet progressively along the plane of said surface, applying a supplemental cutting jet progressively to one of the edges so as to be turned in a curved path therearound by the main jet, and applying a second supplemental cutting jet to the main cutting jet so as to turn the main jet around the other edge to be shaped while heating the regions of jet application to cutting temperature.

11. A cutting blowpipe comprising, in combination, means for providing a main gaseous cutting jet; means for preheating base metal in the region to which the said jet is applied; means attached to said first-mentioned means for directing a gaseous cutting stream of lower velocity than said main cutting stream at an angle into the path of the main cutting jet, and means for directing a pre-heat jet parallel with said last-mentioned cutting stream.

12. Apparatus as claimed in claim 11 in which supplemental cutting jet nozzles are arranged on opposite sides of the means providing the main cutting jet for shaping both edges of a cut made by the main cutting jet.

13. Apparatus as claimed in claim 11 in which means is provided for effecting adjustment between the jet providing means.

14. Process of simultaneously making a cut through a metallic body and shaping the edge produced by said cut, which comprises applying both a high temperature heating medium and a main metal-oxidizing jet progressively against successive portions along the line of cut; and concurrently applying an auxiliary oxygen cutting jet transversely to said edge and obliquely against said main jet below the surface of the metallic body.

15. Process of simultaneously making a cut through a metallic body and shaping the edge produced by said cut, which comprises applying both a high temperature heating medium and a main metal-oxidizing jet progressively against successive portions along the line of cut; and concurrently applying an auxiliary oxygen cutting jet of lower velocity than said main metal-oxidizing jet transversely to said edge and obliquely against said main jet.

16. A process of gas cutting a metal body, comprising projecting a plurality of cutting jets in converging relation so as to intersect within the thickness of the body of metal, maintaining the velocity of one of said jets appreciably lower than the velocity of another of said jets, whereby the lower-velocity jet is deflected by the higher-velocity jet, and providing relative movement between said body and said jets so as to expose successive portions of said body to the action of said jets.

17. A cutting blowpipe comprising means for projecting a high-velocity main gaseous cutting jet against a workpiece; and means for convergently projecting an auxiliary low-velocity gaseous cutting jet uninterruptedly against and into confluence with said main cutting jet.

18. A cutting and edge-shaping blowpipe comprising a main cutting nozzle having preheating and cutting gas passages therethrough, means for connecting said nozzle with respective sources of preheating and cutting gas, an auxiliary cutting nozzle having preheating and cutting gas passages therethrough, means for adjustably positioning said auxiliary nozzle with respect to said main cutting nozle, and means for connecting the respective passages of said auxiliary nozzle with the corresponding passages of said main nozzle.

19. A cutting and edge-shaping blowpipe comprising a main cutting nozzle having preheating and cutting gas passages therethrough, means for connecting said nozzle with respective sources of preheating and cutting gas, an auxiliary cutting nozzle having preheating and cutting gas passages therethrough, and flexible tubing connecting the respective passages of said auxiliary nozzle with the corresponding passages of said main nozzle.

20. A cutting and edge-shaping blowpipe comprising a main cutting nozzle having preheating and cutting gas passages therethrough; an auxiliary cutting nozzle having preheating and cutting gas passages therethrough; supporting means extending between said main nozzle and said auxiliary nozzle, said supporting means being adapted to selectively hold said nozzles in adjusted separated relation and in adjusted angular relation, to cut a ferrous metal member and concurrently shape an edge along such cut.

21. A cutting and edge-shaping blowpipe comprising a substantially vertical main cutting nozzle having preheating and cutting gas passages therethrough; an auxiliary cutting nozzle having preheating and cutting gas passages therethrough; a supporting arm extending outwardly transversely from said main nozzle for supporting said auxiliary cutting nozzle; means permitting said arm to be raised and lowered; and means permitting said auxiliary nozzle to be adjustably positioned horizontally along said arm and in selected angular relation thereto.

22. A cutting blowpipe as claimed in claim 17 wherein said respective means for projecting said gaseous cutting jets comprise a main nozzle having a main cutting gas passage, and an auxiliary nozzle having a cutting gas passage communicating with said main passage.

23. A cutting blowpipe as claimed in claim 17 wherein said respective means comprise a first cutting nozzle having a main cutting gas passage therein, and a second nozzle convergently disposed with respect to said first nozzle, said second nozzle having a restricted cutting gas passage therein communicating with said main cutting gas passage.

ROBERT L. WAGNER.